US008189990B2

(12) United States Patent
Yamada et al.

(10) Patent No.: US 8,189,990 B2
(45) Date of Patent: May 29, 2012

(54) DIGITAL BROADCAST RECEIVING APPARATUS, RECORDING APPARATUS, METHOD AND SYSTEM

(75) Inventors: Masazumi Yamada, Osaka (JP); Junji Yoshida, Osaka (JP); Toshikazu Munezane, Osaka (JP); Kei Ichikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1213 days.

(21) Appl. No.: 11/909,555

(22) PCT Filed: Aug. 29, 2006

(86) PCT No.: PCT/JP2006/316908
§ 371 (c)(1),
(2), (4) Date: Sep. 24, 2007

(87) PCT Pub. No.: WO2007/026662
PCT Pub. Date: Mar. 8, 2007

(65) Prior Publication Data
US 2010/0178040 A1 Jul. 15, 2010

(30) Foreign Application Priority Data

Aug. 30, 2005 (JP) .................................. 2005-249577

(51) Int. Cl.
*H04N 9/80* (2006.01)
(52) U.S. Cl. ....................................... 386/239; 386/248
(58) Field of Classification Search .................... None
See application file for complete search history.

(56) References Cited

U.S. PATENT DOCUMENTS

| 4,998,292 | A | 3/1991 | Eigeldinger et al. |
| 2003/0233451 | A1* | 12/2003 | Ludvig et al. ................. 709/225 |
| 2006/0078279 | A1 | 4/2006 | Koshino |
| 2007/0277201 | A1* | 11/2007 | Wong et al. .................... 725/40 |

FOREIGN PATENT DOCUMENTS

| JP | 8-289281 | 11/1996 |
| JP | 2758174 | 3/1998 |
| JP | 2000-339794 | 12/2000 |
| JP | 2003-87695 | 3/2003 |
| JP | 2005-159579 | 6/2005 |
| JP | 2006-94436 | 4/2006 |
| WO | 03-041399 | 5/2003 |

OTHER PUBLICATIONS

"High-Definition Multimedia Interface Specification Version 1.1 May 20, 2004", [online], Retrieval Date Nov. 20, 2006, <URL:http://www.hdmi.org/download/HDMI_Specification_1.1.pdf> [CEC 13.3. Preset Download] (p. CEC-22 of 82 to CEC-24 of 82). [CEC 13.4. One Touch Record] (p. CEC-26 of 82 to CEC-27 of 82).

\* cited by examiner

*Primary Examiner* — William C Vaughn, Jr.
*Assistant Examiner* — Asher Khan
(74) *Attorney, Agent, or Firm* — Wenderoth, Lind & Ponack, L.L.P.

(57) ABSTRACT

A digital broadcast receiving apparatus which enables simple programming for receiving a digital television broadcast and/or a radio broadcast. The digital broadcast receiving apparatus includes: a broadcast receiving unit receiving a digital broadcast; an extraction unit extracting a service description table from the received digital broadcast; an identification unit identifying, from the extracted service description table, transport stream identification information, network identification information, and service identification information, as stream identification information; and a transmission unit transmitting, to a recording apparatus, the identified stream identification information and a recording command.

13 Claims, 9 Drawing Sheets

FIG. 3

| Preset | TS-ID | Network_ID | Service_ID |
|---|---|---|---|
| 01 | 0x0010 | 0x0020 | 0x0030 |
| 02 | 0x0010 | 0x0020 | 0x0031 |
| 03 | 0x0010 | 0x0020 | 0x0032 |
| | | | |
| | | | |
| 203 | 0x0020 | 0x0032 | 0x0063 |
| 204 | 0x0021 | 0x0032 | 0x0064 |

DIGITAL BROADCAST RECEIVING APPARATUS, RECORDING APPARATUS, METHOD AND SYSTEM

TECHNICAL FIELD

The present invention relates to a technology for programming an AV apparatus, using tuning data (channel, frequency, or the like) for receiving a television broadcast and/or a radio broadcast.

BACKGROUND ART

For example, Patent Reference 1 identified below discloses a programming method for audio apparatuses or video apparatuses. In this programming method, association information between tuning data and a corresponding program number or program identifier is read from a program memory in the AV apparatus which has already been programmed. The aforementioned tuning data is tuning data which is necessary for receiving a television broadcast and/or a radio broadcast. More specifically, it is data, such as a channel or a frequency. The association information which has been read in such a manner is transmitted from an AV apparatus which has already been programmed to an AV apparatus to be programmed via a wired or wireless means. The transmitted information is stored in a program memory of the AV apparatus to be programmed.

According to the technology disclosed in Patent Reference 1, the user can easily program an AV apparatus using tuning data. For example, there are cases where assignment of a program number and a frequency or a channel to radios or televisions differs from the assignment to video recorders. In this case, an operational error may occur when a recording instruction or an instruction for recording reservation is given from a radio or a television to a video recorder. However, using the technology disclosed in Patent Reference 1, it is possible to assign the same program number and frequency or channel to the both AV apparatuses. Thus, the aforementioned operational error can be prevented.

In addition, the specification of Non-patent Reference 1 describes a feature (One Touch Record) requesting a recording apparatus to record a program currently being viewed, by specifying the program number of the program, as well as a feature (Preset Download), disclosed in Patent Reference 1, which assigns the same program number and frequency or channel to AV apparatuses. In other words, the Preset Download feature can place AV apparatuses in a state where the same program number and frequency or channel are assigned. In this state, when the user specifies a program number of a program which needs to be recorded, an effect is produced that there is no need for the user to perform, to a recording apparatus, operations, such as tuning the recording apparatus to the same channel (program number) as a corresponding television (may be referred to as "TV" hereinafter), or pressing the recording button.

Patent Reference 1: Japanese Patent No. 2758174 Publication
Non-patent Reference 1: High-Definition Multimedia Interface Specification Version 1.1 (May 20, 2004)

DISCLOSURE OF INVENTION

Problems that Invention is to Solve

However, the technology disclosed in Patent Reference 1 is a technology used for analog broadcasts based on conventional frequencies and channel numbers. In other words, there are problems that the technology disclosed in Patent Reference 1 can not sufficiently represent the details of a program of a satellite/terrestrial digital broadcast which applies technologies such as MPEG2-TS and can not implement simple programming. For example, the technology disclosed in Patent Reference 1 can not sufficiently implement features, such as One Touch Play disclosed in Non-patent Reference 1.

The present invention has been conceived in view of the aforementioned problems, and the object of the present invention is to provide a digital broadcast receiving apparatus which enables simple programming for receiving a digital television broadcast and/or a radio broadcast.

Means to Solve the Problems

In order to achieve the aforementioned object, the digital broadcast receiving apparatus according to the present invention is a digital broadcast receiving apparatus which receives a digital broadcast, and includes: a broadcast receiving unit that receives a digital broadcast; an extraction unit that extracts a service description table from the received digital broadcast; an identification unit that identifies, from the extracted service description table, transport stream identification information, network identification information, and service identification information, as stream identification information; and a transmission unit that transmits, to a recording apparatus, the identified stream identification information and a recording command. With this, the stream identification information and the recording command are transmitted from the digital broadcast receiving apparatus to the recording apparatus, and it becomes possible to perform simple programming for receiving a digital television broadcast and/or a radio broadcast.

Here, it is possible that the digital broadcast receiving apparatus further includes a storage unit that stores a preset association table which associates preset identification information with the transport stream identification information, the network identification information, and the service identification information, wherein the transmission unit transmits the stored preset association table and the preset identification information, instead of the stream identification information. With this, when the recording apparatus refers to the preset association table based on the preset identification information, it is possible to identify the transport stream identification information, network identification information, and service identification information.

In addition, the transmission unit may transmit the recording command which instructs recording of a service of a currently selected channel, after transmitting the stream identification information as a parameter of a channel selection command. With this, as the stream identification information is transmitted from the digital broadcast receiving apparatus to the recording apparatus, there is no need to transmit the preset association table from the digital broadcast receiving apparatus to the recording apparatus.

In addition, the transmission unit may transmit the stream identification information as a parameter of the recording command. With this, as the stream identification information is transmitted from the digital broadcast receiving apparatus to the recording apparatus, there is no need to transmit the preset association table from the digital broadcast receiving apparatus to the recording apparatus.

In addition, the identification unit may identify, as the stream identification information, information corresponding to a service which is currently being viewed on the digital broadcast receiving apparatus. With this, it becomes possible to record, in the recording apparatus, a program currently being viewed on the digital broadcast receiving apparatus (in other words, to instruct "One Touch Record").

In addition, the identification unit may identify, as the stream identification information, information corresponding to a service for which recording is reserved. With this, the digital broadcast receiving apparatus can instruct the recording apparatus to perform "recording reservation".

Note that it is not only possible to embody the present invention as the above-described digital broadcast receiving apparatus, but also as a digital broadcast receiving method which includes, as the steps, the characteristic units included in such digital broadcast receiving apparatus, as well as programs causing a computer to execute these steps. It should be also noted that such programs can be distributed on a recording medium such as a CD-ROM and via a transmitting medium such as the Internet.

Effects of the Invention

As described above, the present invention enables simple programming for receiving a digital television broadcast and/or a radio broadcast. For example, in SI of MPEG2-TS which indicates a channel (service) currently being viewed, three IDs (Original_Network_ID, TS_ID, Service_ID) are transmitted from a TV to a DVD recorder. Upon the transmission, a recording command is transmitted from the TV to the DVD recorder. With this, it becomes possible to record, in the DVD recorder, a program currently being viewed on the TV by just operating a remote control of the TV without directly operating the DVD recorder. In other words, with this, it becomes possible to perform simple programming on digital broadcasts or to implement features, such as One Touch Record. In addition, an effect in digital broadcasts is also produced that can accurately associate a preset number of each apparatus with a channel to be actually viewed or recorded.

BRIEF DESCRIPTION OF DRAWINGS

FIG. 3 is a diagram showing an example of the preset association table in the first embodiment.

NUMERICAL REFERENCES

Figure 1:
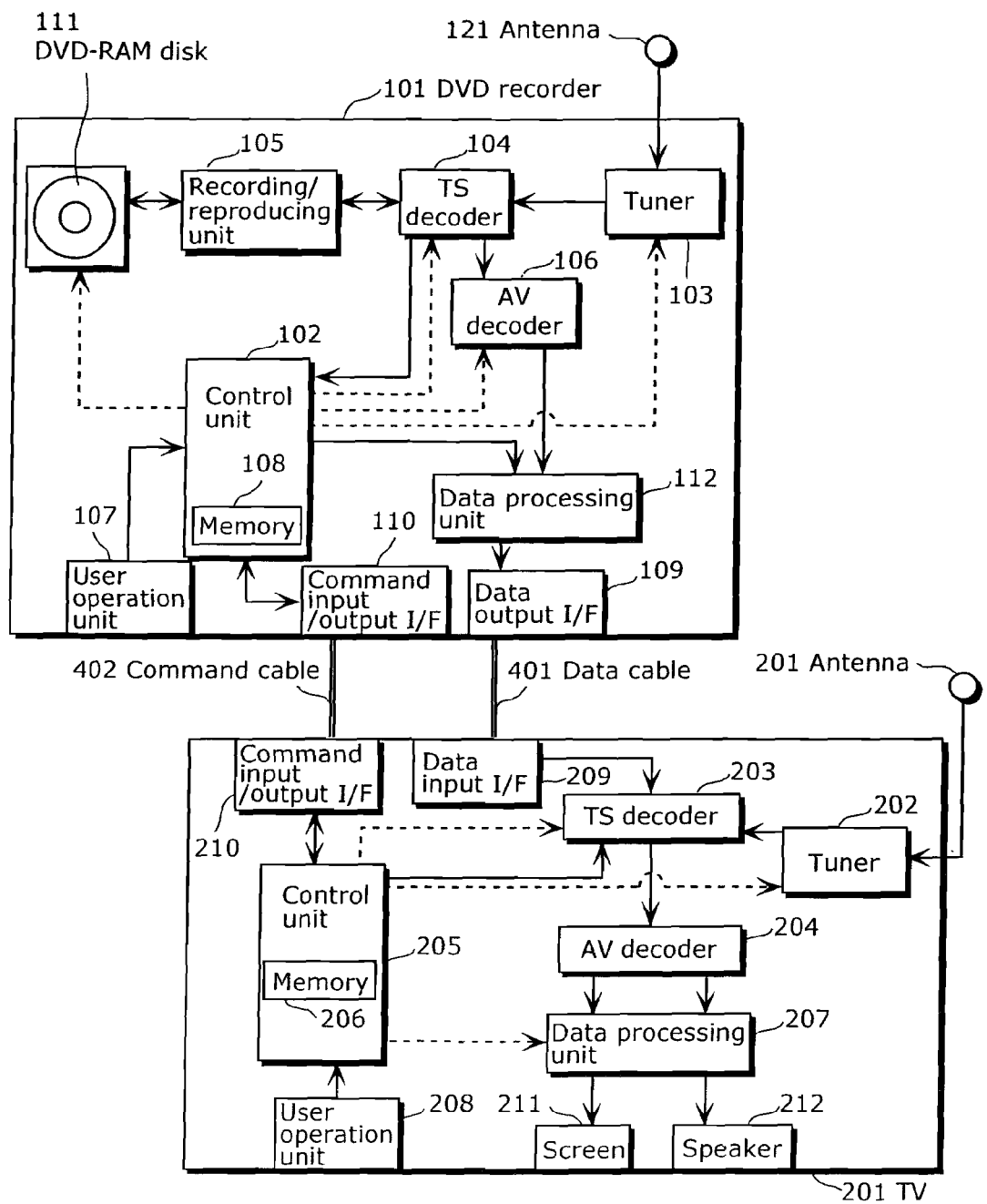
FIG. 1 is diagram showing a example of configuration of the DVD recorder and the TV.

101 DVD recorder
102 Control unit
103 Tuner
104 TS decoder
105 Recording/reproducing unit
106 AV decoder
107 User operation unit
109 Data output I/F
110 Command input/output I/F
111 DVD-RAM disk
112 Data processing unit
121 Antenna
401 Data cable
402 Command cable
201 TV
202 Tuner
203 TS decoder
204 AV decoder
205 Control unit
206 Memory
207 Data processing unit
208 User operation unit
209 Data input I/F
210 Command input/output I/F
211 Screen
212 Speaker

BEST MODE FOR CARRYING OUT THE INVENTION

Preferred embodiments of the present invention will hereinafter be described with reference to the attached diagrams.

(First Embodiment)

The first embodiment of the present invention is described hereinafter using FIG. 1, FIG. 2, and FIG. 3.

FIG. 1 is diagram showing an example of configuration of a DVD recorder 101 and a TV 201. As shown in FIG. 1, the DVD recorder 101 includes a control unit 102, a tuner 103, a TS decoder 104, a recording/reproducing unit 105, an AV decoder 106, a user operation unit 107, a memory 108, a data output I/F 109, a command input/output I/F 110, a DVD-RAM disk 111, a data processing unit 112, and an antenna 121. The TV 201 includes a tuner 202, a TS decoder 203, an AV decoder 204, a control unit 205, a memory 206, a data processing unit 207, a user operation unit 208, a data input I/F 209, a command input/output I/F 210, a screen 211, and a speaker 212. The command input/output I/F 110 of the DVD recorder 101 is connected to the command input/output I/F 210 of the TV 201 via the command cable 402. The data output I/F 109 of the DVD recorder 101 is connected to the data input I/F 209 of the TV 201 via the data cable 401.

The units each having the aforementioned unit number to be described hereinafter are assumed to have the same configuration and functions.

The TV 201 is an example of a digital broadcast receiving apparatus in the present invention, and the DVD recorder 101 is an example of a recording apparatus in the present invention. The TV 201 and the DVD recorder 101 receive digital broadcast data respectively via the antenna 121 and tuner 202 and via the antenna 121 and the tuner 103. The digital broadcast data received and demodulated is converted to a MPEG2-TS format, and is transmitted to the TS decoders 104 and 203.

Figure 2:
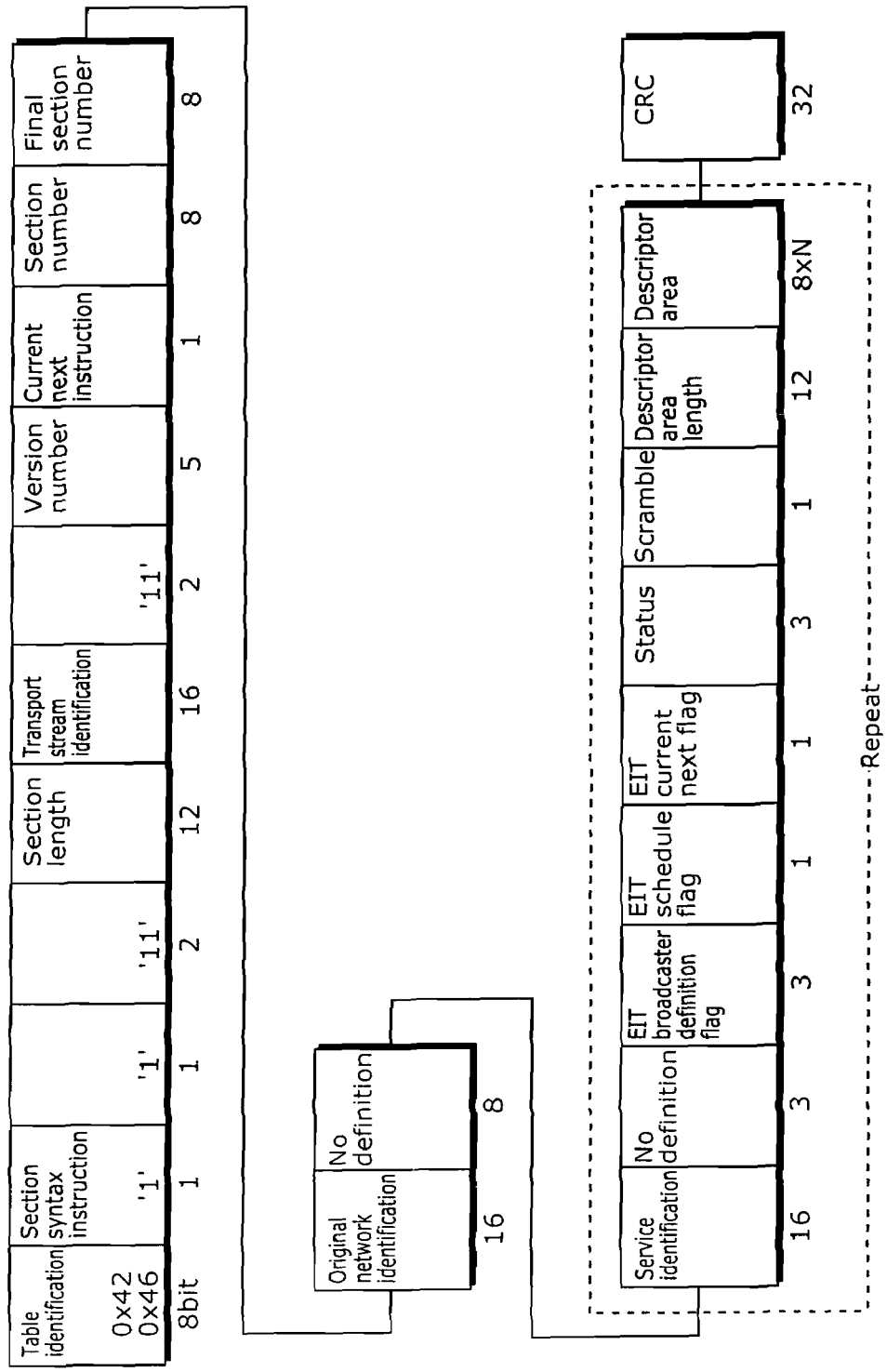
FIG. 2 is a diagram showing an example of the SDT in MPEG2-TS used in a digital broadcast.

FIG. 2 is a diagram showing an example of a Service Description Table (SDT) in Moving Picture Experts Group 2-Transport Stream (MPEG2-TS) used for a digital broadcast.

The configuration of the SDT, a method to find the SDT from MPEG2-TS using information in a Program Association Table (PAT) and a Program Map Table (PMT), and a method to analyze the details in the SDT are known. In other words, TS decoder circuits, LSIs, software programs, and the like which have already been standardized for and correspond to European and Japanese digital TVs exist.

In the present embodiment, the TS decoder 203 of the TV 201 extracts the SDT. With this, service information (corresponding to a list of channels for analog broadcasts), an electronic program guide (EPG), or the like can be presented to the user through the screen 211 and the user operation unit 208. Once the user selects a service through the user operation unit 208, the TS decoder 203 extracts digital AV data corresponding to the service. The AV decoder 204 decodes the extracted digital AV data to audio or video, and the decoded audio or video is outputted respectively from the screen 211 and speaker 212. The same processing is performed in the TS decoder 104 of the DVD recorder 101.

FIG. 3 is a diagram showing an example of a preset association table in the first embodiment. The control unit 205 of the TV 201 creates the preset association table based on the SDT information obtainable from the TS decoder 203 so as to display, on the screen 211, a list of services, such as an EPG, and holds the table in the memory 206. The preset association table is, as shown in FIG. 3, a table which associates "preset identification information (preset number)" with "TS_ID", "Network_ID", and "Service_ID". In other words, the control unit 205 of the TV 201 holds, in the memory 206, "transport stream identification" information in the SDT as "TS_ID", "original network identification" information in the SDT as "Network_ID", and "service identification" information in the SDT as "Service_ID", together with the respective corresponding service numbers (channels).

Once the DVD recorder 101 is connected to the TV 201, the TV 201 and the DVD recorder 101 exchange the apparatus information with each other via the command cable 402. The control unit 205 of the TV 201 judges whether or not the preset association table should be transmitted. Whether or not the preset association table should be transmitted can be judged based on version information exchanged via the command cable 402 or the details of the user's operations in the user operation unit 208.

In the case where the control unit 205 transmits the preset association table, the preset association table held in the memory 206 (refer to FIG. 3) is read. The read preset association table is transmitted from the command input I/F 210 via the command cable 402 in a predetermined message format. The details of the present invention are not subject to a message format to be taken. For example, the preset association table may be transmitted in a character string format, not a table format, and may be transmitted after the preset association table is converted to a predetermined bit string. In addition, information other than the items shown in FIG. 3 (a character string representing the details of a service or the like) may be included in the preset association table, and such preset association table may be transmitted.

Once the control unit 102 of the DVD recorder 101 receives a message related to the preset association table from the command input I/F 110, it holds the preset association table in the same format as the one in held in the memory 206. Then, the preset association table held in the memory 108 can be used as EPG information provided for the user operation unit 107. In other words, the DVD recorder 101 can generate an EPG having the same details as the one in the TV 201.

Figure 4:
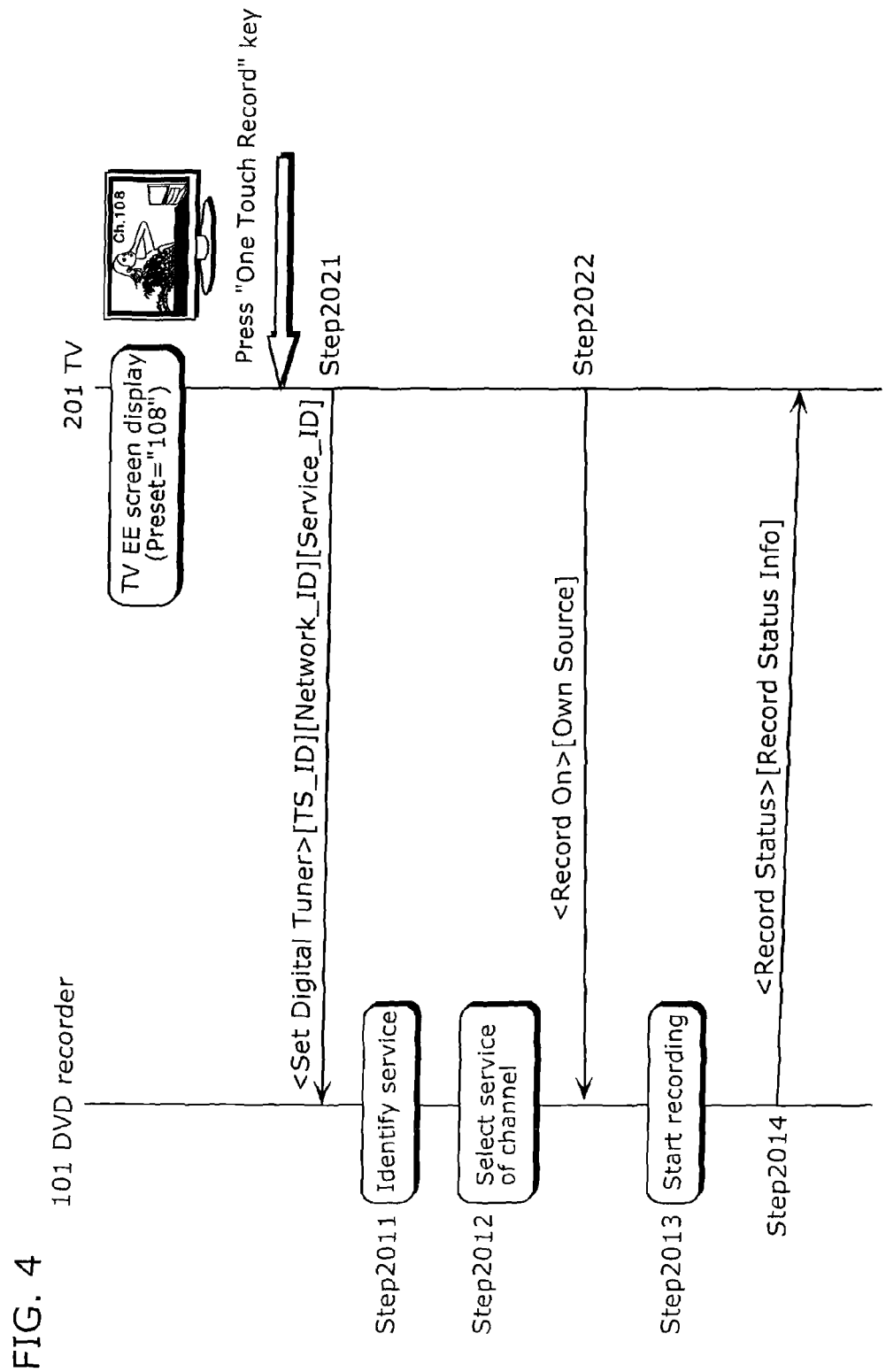
FIG. 4 is a diagram showing an example of a command sequence between the DVD recorder and the TV in the first embodiment.

FIG. 4 is a diagram showing an example of a command sequence between the DVD recorder 101 and the TV 201 in the first embodiment.

The TV 201 receives a digital broadcast service (channel 108 in this example) and outputs it to the screen 211. In this case, once the user presses the "One Touch Record" button in the remote control, such fact is notified from the user operation unit 208 to the control unit 205. The control unit 205 transmits, to the DVD recorder 101 via the command input I/F 210, a message which specifies the service currently being viewed (Step 2021). The message which specifies the service currently being viewed is a message <Preset Digital Tuner> using a "preset number" as a parameter. This message is a message to transmit the preset association table, and a message which instructs the DVD recorder 101 to select a service of a channel represented by a parameter.

Once the control unit 102 of the DVD recorder 101 receives a message <Preset Digital Tuner> from the command input I/F 110, it holds the preset association table in the memory 108. Then, by referring to the preset association table, the control unit 102 identifies "TS_ID", "Network_ID", and "Service_ID" corresponding to the "preset number" which is the parameter of the received message. Then, as is the case with a service selected by the user operation unit 107 using the EPG, the control unit 102 transmits, to the TS decoder 104, the service specified by the identified "TS_ID", "Network_ID", and "Service_ID" (Step 2011). With this, the DVD recorder 101 selects the same service of the channel as the one selected in the TV 201 (Step 2012).

Immediately after this, the control unit 205 of the TV 201 transmits a message <Record On> [Own Source] to the DVD recorder 101 via the command input I/F 210 (Step 2022). This message is disclosed in Non-patent Reference 1, and instructs the DVD recorder 101 to record an input or a service of the channel which is currently being selected by the DVD recorder 101.

Once the control unit 102 of the DVD recorder 101 receives a message <Record On> [Own Source] from the command input I/F 110, it instructs the recording/reproducing unit 105 to record the service. With this, once the recording/reproducing unit 105 starts recording the service (Step 2013), "recording of an input or a service of a currently selected channel" which indicates the detailed instruction of the message <Record On> [Own Source] is to be implemented and a message <Record Status> [Record Status Info] is sent from the DVD recorder 101 to the TV 201 (Step 2014).

As mentioned above, according to the present first embodiment, simple programming for receiving a digital television broadcast and/or a radio broadcast becomes possible. In other words, three IDs (Original_Network_ID, TS_ID, and Service_ID), which indicate a channel (service) currently being viewed, in the SI of MPEG2-TS are transmitted from the TV 201 to the DVD recorder 101, and immediately after that, a recording command is transmitted from the TV 201 to the DVD recorder 101. With this, it becomes possible to record, in the DVD recorder 101, a program which is currently being viewed on the TV 201 by just operating the remote control of the TV 201 without directly operating the DVD recorder 101. In other words, simple programming on a digital broadcast or features such as One Touch Play can be implemented. In addition, an effect is also produced in digital broadcasts that can accurately associate a preset number of each apparatus with a channel to be actually viewed or recorded.

Note that although a message <Preset Digital Tuner> using a "preset number" as a parameter is described as an example herein, a format of a message is not limited to the case used in the present embodiment. In other words, it is the message for transmitting the preset association table, and as long as it is the message to instruct the DVD recorder 101 to select a service of a channel represented by a parameter, the same effect can be obtained.

Note that although a message <Record On> [Own Source] is described as an example herein, a format of a message is not limited to the case used in the present embodiment. In other words, as long as it is the message to instruct the DVD recorder 101 to record an input or a service of the channel which is currently being selected by the DVD recorder 101, the same effect can be obtained.

Note that although a message <Record On> [Own Source] described in Non-patent Reference 1 is described as an example herein, the present invention does not specialize in the HDMI interface described in Non-patent Reference 1. In other words, as long as the user instructs the digital tuner to select a channel via a system which inputs or outputs a command and to start the recording immediately after that, it is possible to realize the present invention without having the HDMI interface.

(Second Embodiment)

Although the first embodiment describes that two messages are transmitted from the TV 201 to the DVD recorder 101, the present second embodiment describes that the two messages are transmitted at one time from the TV 201 to the DVD recorder 101.

Figure 5:
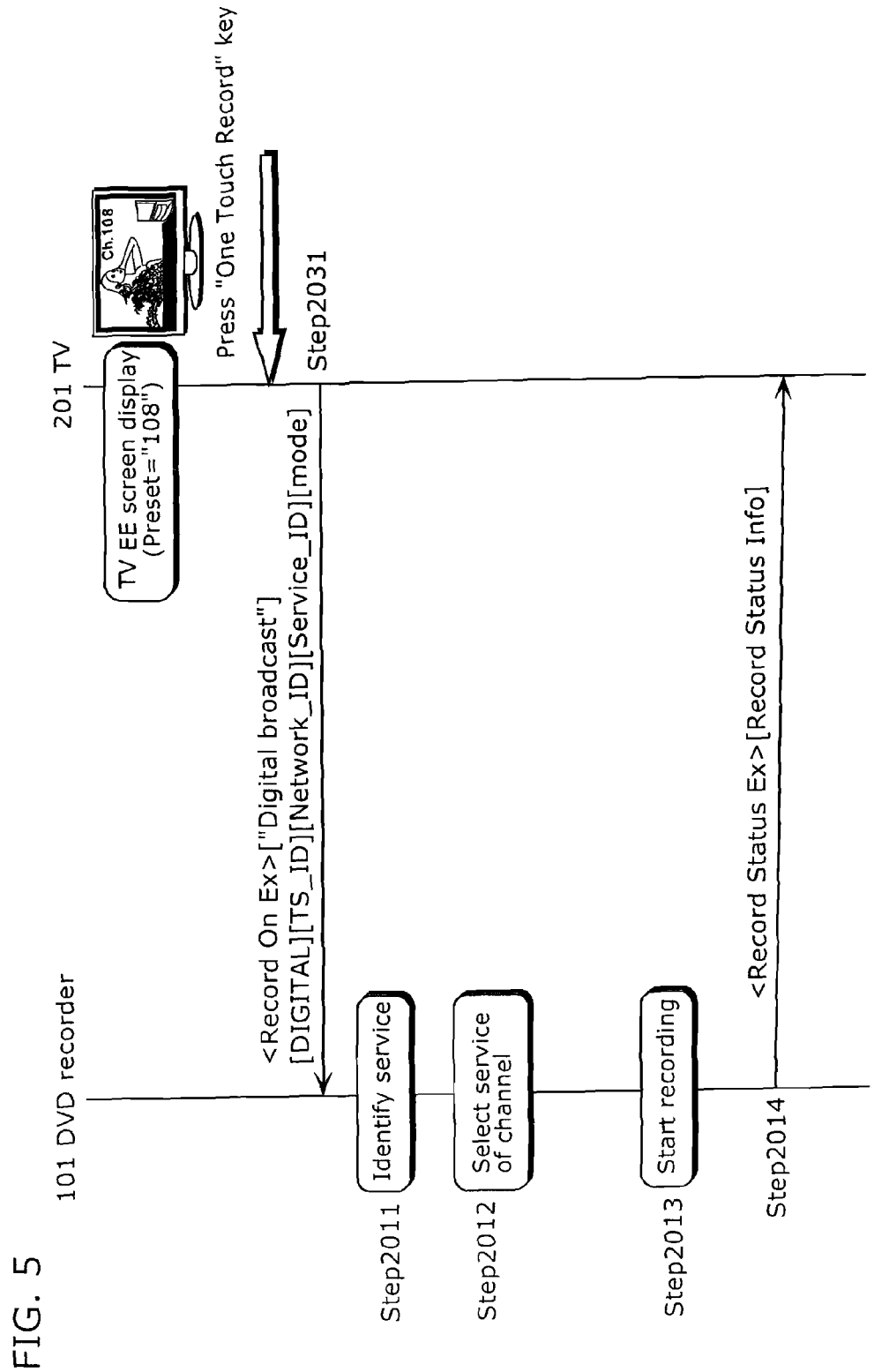
FIG. 5 is a diagram showing an example of a command sequence between the DVD recorder and the TV in the second embodiment.

FIG. 5 is a diagram showing an example of a command sequence between the DVD recorder 101 and the TV 201 in the second embodiment. Herein, FIG. 1 of the first embodiment is used for showing the configuration of the apparatuses in the second embodiment.

The TV 201 receives a digital broadcast service (channel 108 in this example) and outputs it to the screen 211. In this case, when the user presses the "One Touch Record" button in the remote control, such fact is notified from the user operation unit 208 to the control unit 205. The control unit 205 transmits, to the DVD recorder 101 via the command input I/F 210, a message which specifies the service currently being viewed (Step 2031). The message which specifies the service currently being viewed is a message <Record On Ex> using a "preset number" as a parameter. This message is a message to transmit the preset association table, and a message which instructs the DVD recorder 101 to select and record a service of a channel represented by a parameter.

Once the control unit 102 of the DVD recorder 101 receives the message <Record On Ex> from the command input I/F 110, it holds the preset association table in the memory 108. Then, by referring to the preset association table, the control unit 102 identifies "TS_ID", "Network_ID", and "Service_ID" corresponding to the "preset number" which is the parameter of the received message. Then, as is the case with a service selected by the user operation unit 107 using the EPG, the control unit 102 transmits, to the TS decoder 104, the service specified by the identified "TS_ID", "Network_ID", and "Service_ID" (Step 2011). With this, the DVD recorder 101 selects the same service of the channel as the one selected in the TV 201 (Step 2012). The control unit 102 of the DVD recorder 101 further instructs the recording/reproducing unit 105 to record the service. With this, once the recording/reproducing unit 105 starts recording the service (Step 2013), "selecting and recording a service of a channel represented by a parameter" which indicates the detailed instruction of the message <Record On Ex> is to be implemented and a message <Record Status Ex> [Record Status Info] is sent from the DVD recorder 101 to the TV 201 (Step 2014).

As mentioned above, according to the present second embodiment, the message <Record On Ex> using a "preset number" as a parameter can produce the same effect as the first embodiment. In other words, while two messages are transmitted from the TV 201 to the DVD recorder 101 in the first embodiment, the two messages can be transmitted at one time from the TV 201 to the DVD recorder 101 in the present second embodiment.

Note that although the message <Record On Ex> using a "preset number" as a parameter is used as an example, a format of a message is not limited to the case used in the present embodiment. In other word, as long as the message is a message for transmitting the preset association table and for instructing the DVD recorder 101 to select and record a service of a channel represented by a parameter, the same effect can be produced.

(Third Embodiment)

Although the first embodiment describes that the preset association table is transmitted from the TV 201 to the DVD recorder 101, the present third embodiment describes that the preset association table is not transmitted from the TV 201 to the DVD recorder 101.

Figure 6:
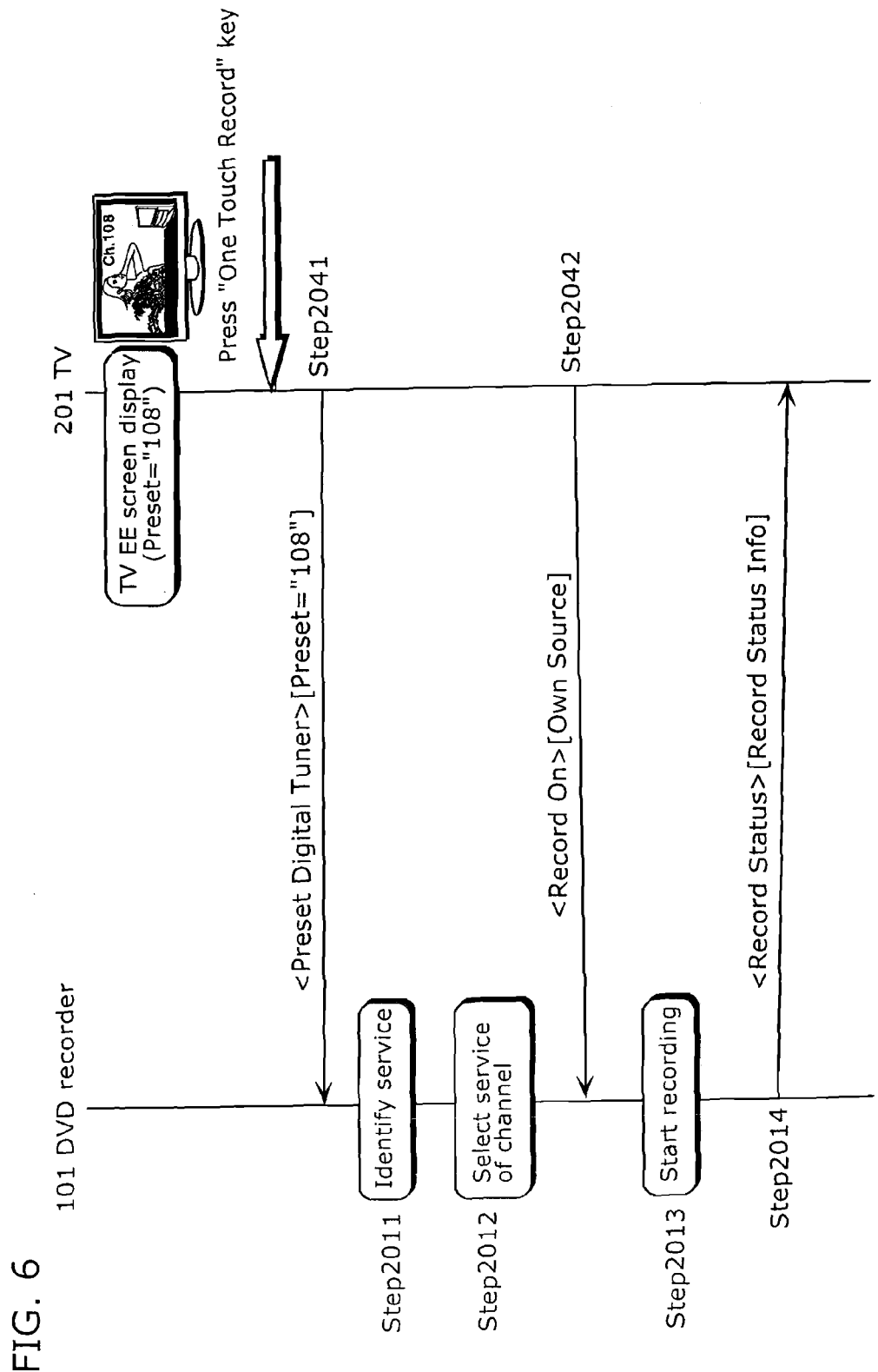
FIG. 6 is a diagram showing an example of a command sequence between the DVD recorder and the TV in the third embodiment.

FIG. 6 is a diagram showing an example of a command sequence between the DVD recorder 101 and the TV 201 in the third embodiment. Herein, FIG. 1 of the first embodiment is used for showing the configuration of the apparatuses in the third embodiment.

The TV 201 receives a digital broadcast service (channel 108 in this example) and outputs it to the screen 211. In this case, when the user presses the "One Touch Record" button in the remote control, such fact is notified from the user operation unit 208 to the control unit 205. The control unit 205 transmits, to the DVD recorder 101 via the command input I/F 210, a message which specifies the service currently being viewed (Step 2041). The message which specifies the service currently being viewed is a message <Set Digital Tuner> using "TS_ID", "Network_ID", and "Service_ID" as parameters.

The control unit 102 of the DVD recorder 101 receives the message <Set Digital Tuner> from the command input I/F 110. Then, as is the case with a service selected by the user operation unit 107 using the EPG, the control unit 102 transmits, to the TS decoder 104, the service specified by the "TS_ID", "Network_ID", and "Service_ID" which are the parameters of the received message (Step 2011). With this, the DVD recorder 101 selects the same service of the channel as the one selected in the TV 201 (Step 2012).

Immediately after this, the control unit 205 of the TV 201 transmits, to the DVD recorder 101 via the command input I/F 210, a message <Record On> [Own Source] (Step 2042). This message is disclosed in Non-patent Reference 1, and instructs the DVD recorder 101 to record an input or a service of the channel which is currently being selected by the DVD recorder 101.

Once the control unit 102 of the DVD recorder 101 receives the message <Record On> [Own Source] from the command input I/F 110, it instructs the recording/reproducing unit 105 to record the service. With this, once the recording/reproducing unit 105 starts recording the service (Step 2013), "recording of an input or a service of a currently selected channel" which indicates the detailed instruction of the message <Record On> [Own Source] is to be implemented and a message <Record Status Info> is sent from the DVD recorder 101 to the TV 201 (Step 2014).

As mentioned above, according to the present third embodiment, even when the preset association table is not transmitted from the TV 201 to the DVD recorder 101, the same effect as the first embodiment can be produced. In other words, with the combination of the aforementioned two messages, the TV 201 can make the DVD recorder 101 record the contents currently being viewed on the TV 201 without operating the remote control of the DVD recorder 101.

Note that although the message <Set Digital Tuner> using "TS_ID", "Network_ID", and "Service_ID" as parameters is used as an example, a format of a message is not limited to the case used in the present embodiment. In other word, as long as the message is a message which instructs the DVD recorder 101 to select the service of the channel specified by "TS_ID", "Network_ID", and "Service_ID", the same effect can be produced.

Note that although the message <Record On> [Own Source] is used as an example, a format of a message is not limited to the case used in the present embodiment. In other word, as long as the message is a message which instructs the DVD recorder 101 to record an input or a service of the channel which is currently being selected by the DVD recorder 101, the same effect can be produced.

(Fourth Embodiment)

Although the third embodiment describes that two messages are transmitted from the TV 201 to the DVD recorder 101, the fourth embodiment describes that these two messages are transmitted from the TV 201 to the DVD recorder 101 at one time.

Figure 7:
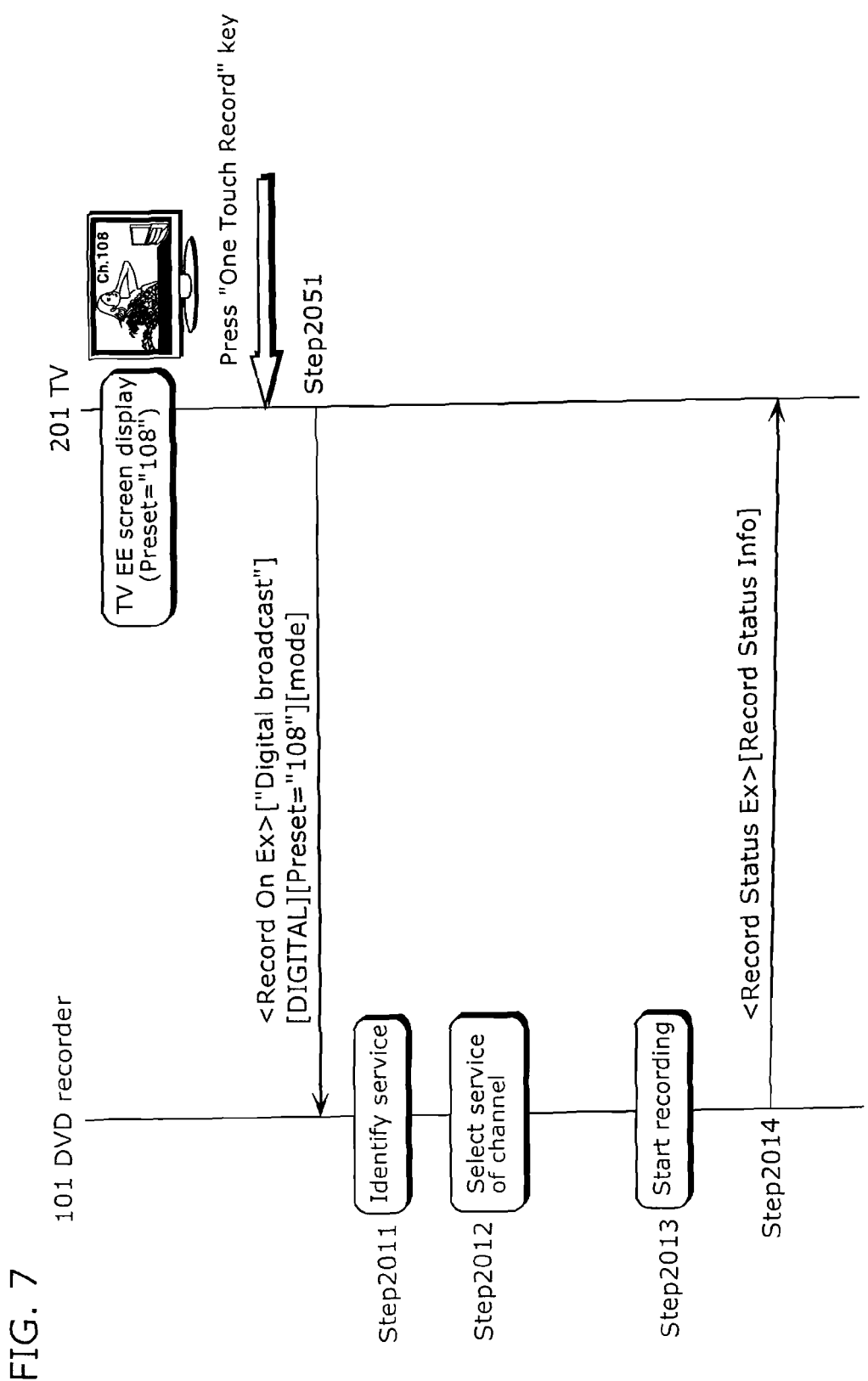
FIG. 7 is a diagram showing an example of a command sequence between the DVD recorder and the TV in the fourth embodiment.

FIG. 7 is a diagram showing an example of a command sequence between the DVD recorder 101 and the TV 201 in the fourth embodiment. Herein, FIG. 1 of the first embodiment is used for showing the configuration of the apparatuses in the fourth embodiment.

The TV 201 receives a digital broadcast service (channel 108 in this example) and outputs it to the screen 211. In this case, when the user presses the "One Touch Record" button in the remote control, such fact is notified from the user operation unit 208 to the control unit 205. The control unit 205 transmits, to the DVD recorder 101 via the command input I/F 210, a message which specifies the service currently being viewed (Step 2051). The message which specifies the service currently being viewed is a message <Record On Ex> using "TS_ID", "Network_ID", and "Service_ID" as parameters. This message is a message which instructs the DVD recorder 101 to select and record a service of a channel represented by parameters.

The control unit 102 of the DVD recorder 101 receives a message <Record On Ex> from the command input I/F 110. Then, as is the case with a service selected by the user operation unit 107 using the EPG, the control unit 102 transmits, to the TS decoder 104, the service specified by the "TS_ID", "Network_ID", and "Service_ID" which are the parameters of the received message (Step 2011). With this, the DVD recorder 101 selects the same service of the channel as the one selected in the TV 201 (Step 2012). The control unit 102 of the DVD recorder 101 further instructs the recording/reproducing unit 105 to record the service. Once the recording/reproducing unit 105 starts recording the service (Step 2013), "selecting and recording a service of a channel represented by a parameter" which indicates the detailed instruction of the message <Record On Ex> is to be implemented and a message <Record Status Ex> [Record Status Info] is sent from the DVD recorder 101 to the TV 201 (Step 2014).

As mentioned above, according to the present fourth embodiment, the message <Record On Ex> using "TS_ID", "Network_ID", and "Service_ID" as parameters can produce the same effect as the third embodiment. In other words, while two messages are transmitted from the TV 201 to the DVD recorder 101 in the third embodiment, the two messages can be transmitted from the TV 201 to the DVD recorder 101 at one time in the fourth embodiment.

Note that although the message <Record On Ex> using "TS_ID", "Network_ID", and "Service_ID" as parameters is used as an example, a format of a message is not limited to the case used in the present embodiment. In other word, as long as the message is a message which instructs the DVD recorder 101 to select and record a service of a channel specified by "TS_ID", "Network_ID", and "Service_ID", the same effect can be produced.

Fifth Embodiment

Although the first to fourth embodiments describe the operations in the case where "One Touch Record" is instructed, the fifth embodiment describes the operation in the case where "recording reservation" is instructed.

Figure 8:
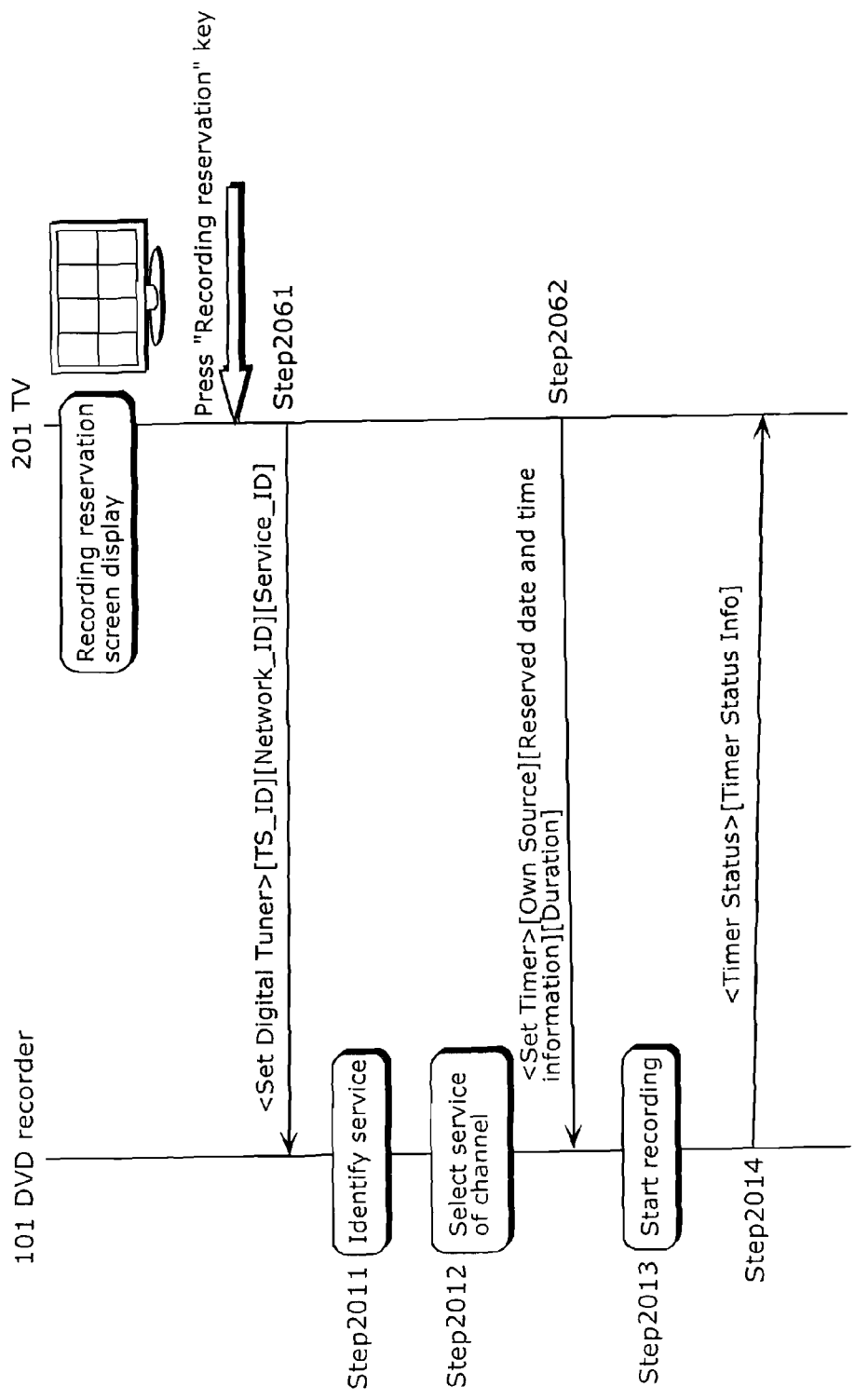
FIG. 8 is a diagram showing an example of a command sequence between the DVD recorder and the TV in the fifth embodiment.

FIG. 8 is a diagram showing an example of a command sequence between the DVD recorder 101 and the TV 201 in the fifth embodiment. Herein, FIG. 1 of the first embodiment is used for showing the configuration of the apparatuses in the fifth embodiment.

The TV 201 outputs a menu for performing recording reservation to the screen 211. In this case, once the user instructs "recording reservation" in a state where the user has inputted the necessary information, such fact is notified from the user operation unit 208 to the control unit 205. The control unit 205 transmits, to the DVD recorder 101 via the command input I/F 210, a message which specifies the service for which recording is reserved (Step 2061). The message which specifies the service for which recording is reserved is a message <Set Digital Tuner> using "TS_ID", "Network_ID", and "Service_ID" as parameters.

The control unit 102 of the DVD recorder 101 receives a message <Set Digital Tuner> from the command input I/F 110. Then, as is the case with a service selected by the user operation unit 107 using the EPG, the control unit 102 transmits, to the TS decoder 104, the service specified by the "TS_ID", "Network_ID", and "Service_ID" which are the parameters of the received message (Step 2011). With this, the DVD recorder 101 selects the same service of the channel as the one selected in the TV 201 (Step 2012).

Immediately after this, the control unit 205 of the TV 201 transmits a message <Set Timer> [Own Source] [Reserved date and time information] [Duration] to the DVD recorder 101 via the command input I/F 210 (Step 2062). This message instructs the DVD recorder 101 to perform the recording reservation of an input or a service of the channel which is currently being selected by the DVD recorder 101. The reserved date and time information is information indicating the date and time to start recording, more specifically, "date", "hour", and "minute". "Duration" is information indicating record time, more specifically, "hour" and "minute".

The control unit 102 of the DVD recorder 101 receives a message <Set Timer> [Own Source] [Reserved date and time information] [Duration] from the command input I/F 110. Then, when the date and time indicated by the reserved date and time information has come, the control unit 102 instructs the recording/reproducing unit 105 to record the service for the length of the time indicated by "Duration". With this, once the recording/reproducing unit 105 starts recording the service (Step 2013), recording reservation which is the detailed instruction of the message <Set Timer> [Own Source] [Reserved date and time information] [Duration] is to be implemented and a message <Timer Status> [Timer Status Info] is sent from the DVD recorder 101 to the TV 201 (Step 2014).

As mentioned above, according to the present fifth embodiment, with the message <Set Timer>, the TV 201 can instruct the DVD recorder 101 to perform "recording reservation". Although there is a difference between the first to fourth embodiments and the present fifth embodiment whether the key is "One Touch Record" or "recording reservation", the present fifth embodiment is similar to the first to fourth embodiments in that three IDs (Original_Network_ID, TS_ID, Service_ID) and a recording command are transmitted from the TV 201 to the DVD recorder 101.

Note that although the message <Set Timer> is used as an example, a format of a message is not limited to the case used in the present embodiment. In other word, as long as the message is a message which instructs the DVD recorder 101 to select and record a service of a channel for which recording is reserved, the same effect can be produced.

(Sixth Embodiment)

Although the fifth embodiment describes that two messages are transmitted from the TV 201 to the DVD recorder 101, the present sixth embodiment describes that the two messages are transmitted at one time from the TV 201 to the DVD recorder 101.

Figure 9:
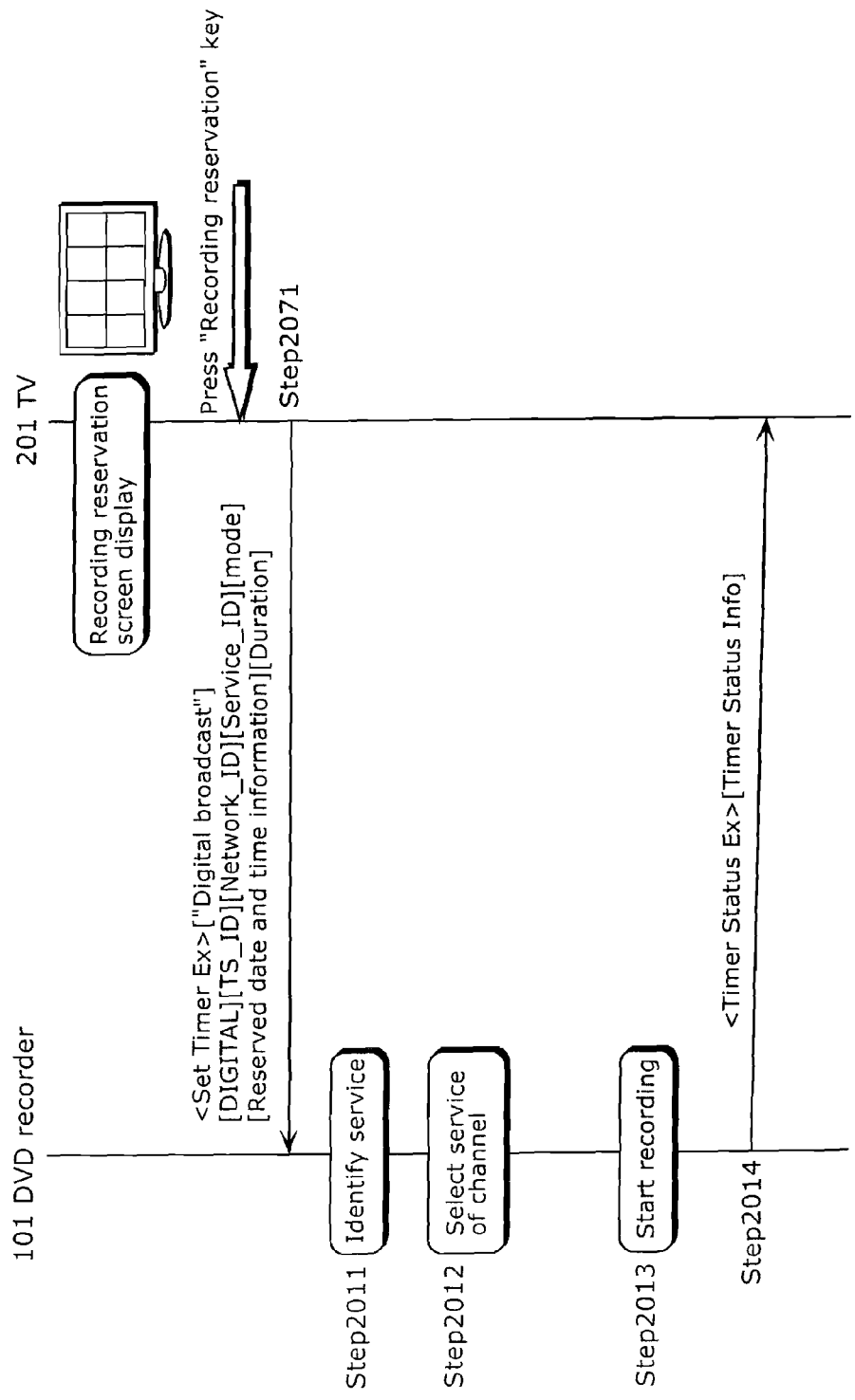
FIG. 9 is a diagram showing an example of a command sequence between the DVD recorder and the TV in the sixth embodiment.

FIG. 9 is a diagram showing an example of a command sequence between the DVD recorder 101 and the TV 201 in the sixth embodiment. Herein, FIG. 1 of the first embodiment is used for showing the configuration of the apparatuses in the sixth embodiment.

The TV 201 outputs a menu for performing recording reservation to the screen 211. In this case, once the user instructs "recording reservation" in a state where the user has inputted the necessary information, such fact is notified from the user operation unit 208 to the control unit 205. The control unit 205 transmits, to the DVD recorder 101 via the command input I/F 210, a message which specifies the service for which recording is reserved (Step 2071). The message which specifies the service for which recording is reserved is a message <Set Timer Ex> using "TS_ID", "Network_ID", "Service_ID", [Reserved date and time information], and [Duration] as parameters. This message is a message to instruct the DVD recorder 101 to select a service of a channel represented by a parameter and perform the recording reservation.

The control unit 102 of the DVD recorder 101 receives a message <Set Timer Ex> "TS_ID" "Network_ID" "Service ID" [Reserved date and time information] [Duration] from the command input I/F 110. Then, when the date and time indicated by the reserved date and time information has come, the control unit 102 transmits, to the TS decoder 104, the service specified by the "TS_ID", "Network_ID", and "Service_ID" which are the parameters of the received message for the length of the time indicated by "Duration" (Step 2011). With this, the DVD recorder 101 selects the same service of the channel as the one selected in the TV 201 (Step 2012). The control unit 102 of the DVD recorder 101 further instructs the recording/reproducing unit 105 to record the service. With this, once the recording/reproducing unit 105 starts recording the service (Step 2013), recording reservation which is the detailed instruction of the message <Set Timer Ex> is to be implemented and a message <Timer Status Info] is sent from the DVD recorder 101 to the TV 201 (Step 2014).

As mentioned above, according to the present sixth embodiment, with the message <Set Timer Ex> using "TS_ID", "Network_ID", "Service_ID", [Reserved date and time information], and [Duration] as parameters, it is possible to produce the same effect as the fifth embodiment. In other words, while two messages are transmitted from the TV 201 to the DVD recorder 101 in the fifth embodiment, the two messages can be transmitted from the TV 201 to the DVD recorder 101 at one time in the sixth embodiment.

Note that although the message <Set Timer Ex> using "TS_ID", "Network_ID", "Service_ID", [Reserved date and time information], and [Duration] as parameters, is used as an example, a format of a message is not limited to the case used in the present embodiment. In other word, as long as the message is a message which instructs the DVD recorder 101 to select a service of a channel specified by "TS_ID", "Net-work_ID", and "Service_ID" and to perform recording reservation, the same effect can be produced.

Note that although "Reserved date and time information" and "Duration" are exemplified as the parameters of the <Set Timer> message and <Set Timer Ex> message, the present invention is not limited to these. In other words, even when "recording start time" and "recording end time" are introduced as the parameters of these messages, the same effect can be produced.

Note that the tuner 202 in the embodiments is an example of a broadcast receiving unit according to the present invention. Furthermore, the TS decoder 203 in the embodiments is an example of an extraction unit according to the present invention. Furthermore, the control unit 205 in the embodiments is an example of an identification unit according to the present invention. Furthermore, the command input/output I/F 210 in the embodiments is an example of a transmission unit according to the present invention. Furthermore, the memory 206 in the embodiments is an example of a storage unit according to the present invention. Furthermore, the command input/output I/F 110 in the embodiments is an example of a receiving unit according to the present invention. Furthermore, the tuner 103 in the embodiments is an example of a channel selection unit according to the present invention. Furthermore, the recording/reproducing unit 105 in the embodiments is an example of a recording unit according to the present invention.

INDUSTRIAL APPLICABILITY

As examples of the industrial applications, the present invention can be applied to a TV or a Set Top Box (STB) which is necessary to enable simple programming for receiving a digital television broadcast and/or a radio broadcast.

The invention claimed is:

1. A digital broadcast receiving apparatus receiving a digital broadcast and controlling a recording apparatus, the digital broadcast receiving apparatus comprising:
    a broadcast receiving unit operable to receive the digital broadcast;
    an extraction unit operable to extract a service description table from the received digital broadcast;
    an identification unit operable to identify, as stream identification information, (i) transport stream identification information, (ii) network identification information, and (iii) service identification information, the stream identification information being identified from the extracted service description table; and
    a transmission unit operable to transmit the identified stream identification information and a recording command the recording apparatus having a unique preset number associated with the transport stream identification information, the network identification information and the service identification information of the identified stream identification information.

2. The digital broadcast receiving apparatus according to claim 1, further comprising a storage unit operable to store a preset association table associating the unique preset number with the transport stream identification information, the network identification information, and the service identification information,
    wherein said transmission unit is operable to transmit the stored preset association table and the unique preset number.

3. The digital broadcast receiving apparatus according to claim 1, wherein said transmission unit is operable to transmit the recording command, which instructs a recording of a service of a currently selected channel, after transmitting the identified stream identification information as a parameter of a channel selection command.

4. The digital broadcast receiving apparatus according to claim 1, wherein said transmission unit is operable to transmit the identified stream identification information as a parameter of the recording command.

5. The digital broadcast receiving apparatus according to claim 1, wherein said identification unit is operable to identify, as the stream identification information, information corresponding to a service currently being viewed on said digital broadcast receiving apparatus.

6. The digital broadcast receiving apparatus according to claim 1, wherein said identification unit is operable to identify, as the stream identification information, information corresponding to a service for which a recording is reserved.

7. A digital broadcast receiving method of receiving a digital broadcast and controlling a recording apparatus, the digital broadcast receiving method comprising:
receiving the digital broadcast;
extracting a service description table from the received digital broadcast;
identifying, as stream identification information, (i) transport stream identification information, (ii) network identification information, and (iii) service identification information, the stream identification information being identified from the extracted service description table; and
transmitting the identified stream identification information and a recording command the recording apparatus having a unique preset number associated with the transport stream identification information, the network identification information and the service identification information of the identified stream identification information.

8. A digital broadcast receiving system comprising:
a digital broadcast receiving apparatus; and
a recording apparatus,
wherein said digital broadcast receiving apparatus includes:
a broadcast receiving unit operable to receive a digital broadcast;
an extraction unit operable to extract a service description table from the received digital broadcast;
an identification unit operable to identify, as stream identification information, (i) transport stream identification information, (ii) network identification information, and (iii) service identification information, the stream identification information being identified from the extracted service description table; and
a transmission unit operable to transmit the identified stream identification information and a recording command to said recording apparatus having a unique preset number associated with the transport stream identification information, the network identification information and the service identification information of the identified stream identification information; and
wherein said recording apparatus includes:
the unique preset number;
a receiving unit operable to receive the identified stream identification information and the recording command transmitted by said transmission unit of said digital broadcast receiving apparatus;
a channel selection unit operable to select a service of a channel from the digital broadcast based on the received stream identification information; and
a recording unit operable to record the service of the selected channel based on the received recording command.

9. The digital broadcast receiving apparatus according to claim 1, wherein said broadcast receiving unit is operable to convert the received digital broadcast to an MPEG2-TS format.

10. The digital broadcast receiving system according to claim 8, wherein said digital broadcast receiving apparatus is one of a TV and a set-top box, and said recording apparatus is a DVD recorder.

11. A digital broadcast recording apparatus for recording digital broadcast data, said digital broadcast recording apparatus comprising:
a unique preset number associated with transport stream identification information, network identification information and service identification information of identified stream identification information;
a broadcast receiving unit operable to receive digital broadcast data;
a receiving unit operable to receive the identified stream identification information and a recording command which are both transmitted from an external apparatus, the received stream identification information including the transport stream identification information, the network identification information and the service identification information;
a channel selection unit operable to select a service of a channel from the digital broadcast data received by said broadcast receiving unit based on the received stream identification information received by said receiving unit; and
a recording unit operable to record the service of the channel selected by said channel selection unit based on the received recording command received by said receiving unit.

12. The digital broadcast recording apparatus according to claim 11, wherein said digital broadcast recording apparatus is a DVD recorder.

13. The digital broadcast recording apparatus according to claim 11, wherein said broadcast receiving unit is operable to convert the received digital broadcast to an MPEG2-TS format.

* * * * *